(12) United States Patent
Sugawara

(10) Patent No.: US 6,755,538 B2
(45) Date of Patent: Jun. 29, 2004

(54) PROJECTION-TYPE IMAGE DISPLAY DEVICE

(75) Inventor: Saburo Sugawara, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/406,500

(22) Filed: Apr. 4, 2003

(65) Prior Publication Data
US 2003/0193650 A1 Oct. 16, 2003

(30) Foreign Application Priority Data
Apr. 12, 2002 (JP) ........................................ 2002-111103

(51) Int. Cl.[7] .............................................. G03B 21/14
(52) U.S. Cl. ...................................................... 353/97
(58) Field of Search ............................. 353/31, 33, 34, 353/37; 349/5, 7, 8; 359/739

(56) References Cited

U.S. PATENT DOCUMENTS

| | | | | |
|---|---|---|---|---|
| 5,607,216 A | * | 3/1997 | Kaneko et al. ............... | 353/97 |
| 5,743,612 A | * | 4/1998 | Matsuda et al. ............... | 353/97 |
| 5,924,783 A | * | 7/1999 | Jones ............................ | 353/97 |
| 6,631,997 B2 | * | 10/2003 | Miyata et al. ................. | 353/97 |

* cited by examiner

Primary Examiner—William C. Dowling
(74) Attorney, Agent, or Firm—Fitzpatrick, Cella, Harper & Scinto

(57) ABSTRACT

A projector-type image display device includes a liquid crystal display device for forming an image, an illumination optical system for illuminating the liquid crystal display device with light from a light source, a projection optical system for projecting an image from the liquid crystal display device, and a diaphragm member disposed on at least one of the illumination optical system and the projection optical system. An aperture is formed in the diaphragm member, and the aperture has a shape such that the f-numbers at a plurality of directions from the at least one optical system are different f-numbers, according to contrast properties of each direction of the liquid crystal display device.

27 Claims, 7 Drawing Sheets

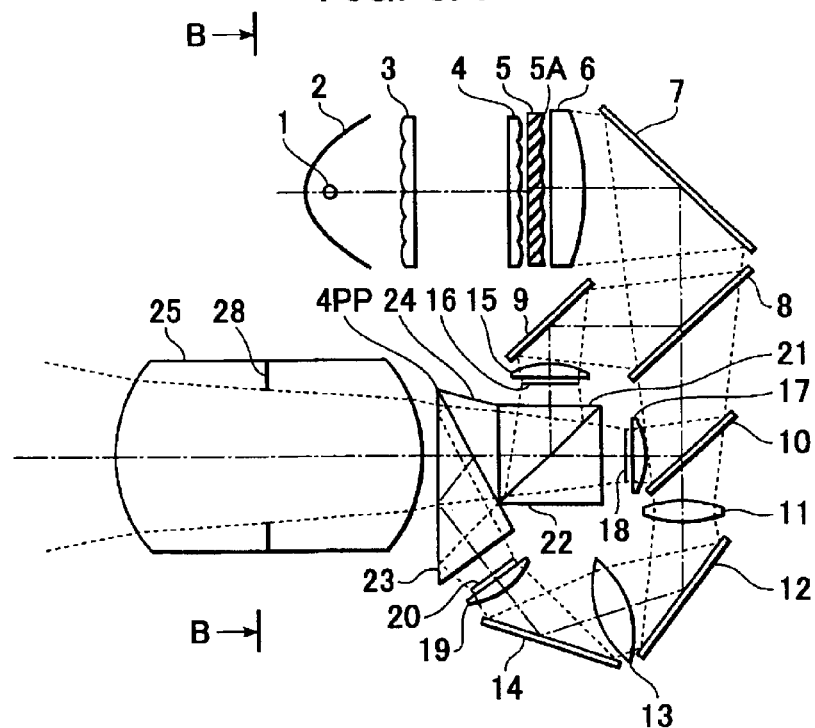
FIG. 3A
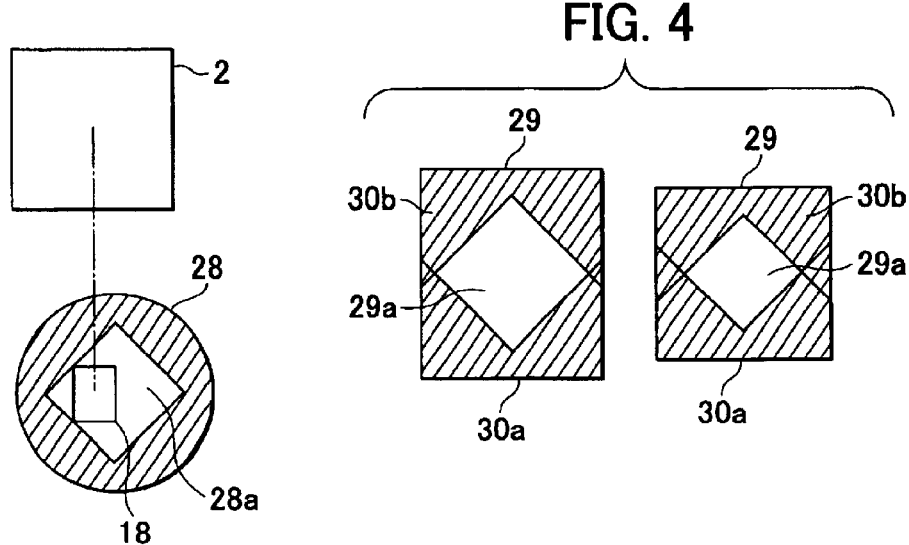
FIG. 3B
FIG. 4

PROJECTION-TYPE IMAGE DISPLAY DEVICE

BACKGROUND OF THE INVENTION

1. Field of the Invention

The present invention relates to a projection-type image display device (liquid crystal projector) wherein an image generated on a liquid crystal panel is projected in an enlarged manner on a projection face by a projection optical system (e.g., a projection lens).

2. Description of the Related Art

Conventionally, various types of techniques have been proposed relating to liquid crystal projectors for illuminating a liquid crystal panel (liquid crystal or liquid crystal display device) with light flux from a light source, modulating the light flux at the liquid crystal panel, and projecting on a screen in an enlarged manner an image based on transmitted light or reflected light emitted from the liquid crystal panel.

Liquid crystal panels often used for liquid crystal projectors normally comprise polarizing filters of polarizers or analyzers on the front and back of the liquid crystal layer. Polarizing filters have properties of transmitting particular polarized components of incident light, and shielding polarized components which have polarization direction orthogonal thereto.

Image display devices using liquid crystal (liquid crystal panels) generally are of a nature that the contrast changes in the event that the viewing angle (direction) from the center of the liquid crystal display screen changes, since properties of the liquid crystal result in viewing angle properties (viewing angle dependency) in the contrast (ratio between transmission and non-transmission of light).

Projecting an image on the screen using an image display device with a the liquid crystal panel having such viewing angle properties regarding contrast has caused irregularities in brightness depending on the viewing direction. Also, this has caused color irregularities with color liquid crystal projectors.

There are the following configurations designed as image display devices configured to make such irregularities inconspicuous. A first conventional image display device is a device which has a configuration for compressing the illumination light by an optical system corresponding to the form of the liquid crystal panel in order to prevent picking up light at portions wherein the viewing angle properties regarding contrast are poor, thereby increasing the f-number of the illumination optical system as viewed from the liquid crystal panel. Also, a second conventional image display device has been configured with a visual angle improving film for improving viewing angle properties regarding contrast of the liquid crystal panel between a polarizing plate and the liquid crystal panel, thereby making the color irregularities in black color display of the liquid crystal panel less conspicuous.

With the first image display device, there is the need to compress the illumination light emitted from the light source with an illumination optical system, in order to make the f-number (brightness) of the illumination optical system as viewed form the liquid crystal panel greater (darker). With a configuration using a fly-eye lens as the configuration for compressing illumination light with the illumination optical system, there is the need to make the size of the fly-eye lens at the side of the liquid crystal panel smaller than the fly-eye lens at the light source side. With this configuration, vignetting of the light source image due to the aperture stop of the polarization converter is great, causing problems in that the illumination efficiency drops, and the brightness of the image projected on the screen drops.

Also, with the second conventional image display device, there is a configuration wherein a visual angle improving film is placed between a polarizing plate and the liquid crystal panel. With this configuration, the spacing between the liquid crystal panel and the visual angle improving film, and the spacing between the visual angle improving film and the polarizing plate, become narrow. This makes for poorer passage of cooling air, resulting in difficulties in cooling the liquid crystal panel and polarizing plate. This has also resulted in the problem that the device becomes more complex, due to the use of the visual angle improving film.

SUMMARY OF THE INVENTION

It is an object of the present invention to provide a projection-type image display device with a new configuration, which reduces or eradicates the problem of visual angle dependency in the visual contrast of liquid crystal panels.

According to a first aspect of the present invention, a projector-type image display device comprises: a liquid crystal display device for forming an image; an illumination optical system for illuminating the liquid crystal display device with light from a light source; a projection optical system for projecting an image from the liquid crystal display device; and a diaphragm member disposed on at least one optical system of the illumination optical system and the projection optical system; wherein an aperture is formed in the diaphragm member; and wherein the aperture has a shape such that the f-numbers at a plurality of directions from the at least one optical system are different f-numbers, according to contrast properties of each direction of the liquid crystal display device.

According to a second aspect of the present invention, a projector-type image display device comprises: a plurality of liquid crystal display devices which each form images; an illumination optical system for dividing light from a light source into a plurality of different color lights, and illuminating each of the liquid crystal display devices with a matching color light; a color synthesizing optical system for synthesizing the images from each of the color lights from the plurality of liquid crystal display devices, the color synthesizing optical system comprising an odd-number reflection optical path wherein an image of a color light from one liquid crystal display device of the plurality of liquid crystal display devices reflects an odd number of times on an optical path leading from the one liquid crystal display device to a projection optical system; and an even-number reflection optical path wherein an image of a color light from another liquid crystal display device of the plurality of liquid crystal display devices is non-reflective or reflects an even number of times on an optical path leading from the another liquid crystal display device to a projection optical system; a projection optical system for projecting an image synthesized by the color synthesizing optical system; and a diaphragm member disposed on at least one optical system of the illumination optical system and the projection optical system; wherein an aperture is formed in the diaphragm member; and wherein the aperture has a shape such that the f-numbers at a plurality of directions from the at least one optical system are different f-numbers, according to contrast properties of each direction of the liquid crystal display device and the reflection optical path of the color synthesizing optical system.

The diaphragm member may be disposed at the illumination optical system, with the aperture of the diaphragm member having a shape such that a first f-number of the illumination optical system is greater than a second f-number of the illumination optical system, with the first f-number being an f-number of the illumination optical system in a direction matching the direction of the liquid crystal display device for first contrast properties, and with the second f-number being an f-number of the illumination optical system in a direction matching the direction of the liquid crystal display device for second contrast properties with contrast properties higher than the first contrast properties.

The diaphragm member may be disposed at the projection optical system, with the aperture of the diaphragm member having a shape such that a first f-number of the projection optical system is greater than a second f-number of the projection optical system, with the first f-number being an f-number of the projection optical system in a direction matching the direction of the liquid crystal display device for first contrast properties, and with the second f-number being an f-number of the projection optical system in a direction matching the direction of the liquid crystal display device for second contrast properties with contrast properties higher than the first contrast properties.

The diaphragm member may comprise a first diaphragm member disposed at the illumination optical system, and a second diaphragm member disposed at the projection optical system, with a first aperture being formed in the first diaphragm member and a second aperture formed in the second diaphragm member, and with the first aperture having a shape such that a first f-number of the illumination optical system is greater than a second f-number of the illumination optical system, the first f-number being an f-number of the illumination optical system in a direction matching the direction of the liquid crystal display device for first contrast properties, and the second f-number being an f-number of the illumination optical system in a direction matching the direction of the liquid crystal display device for second contrast properties with contrast properties higher than the first contrast properties, with the second aperture having a shape such that a first f-number of the projection optical system is greater than a second f-number of the projection optical system, the first f-number being an f-number of the projection optical system in a direction matching the direction of the liquid crystal display device for first contrast properties, and the second f-number being an f-number of the projection optical system in a direction matching the direction of the liquid crystal display device for second contrast properties with contrast properties higher than the first contrast properties.

The liquid crystal display device may have a rectangular display portion with a width of the aperture of the aperture of the diaphragm member in the diagonal direction as to the long side direction of the rectangular display portion being shorter than a width of the aperture in the direction matching the long side direction and short side direction of the rectangular display portion.

A size of the aperture of the diaphragm member may be variable.

An optical axis of the projection optical system and a center of the liquid crystal display device may be offset.

According to a third aspect of the present invention, a projector-type image display device comprises: a plurality of liquid crystal display devices which each form images; an illumination optical system for dividing light from a light source into a plurality of different color lights, and illuminating each of the liquid crystal display devices with a matching color light; a color synthesizing optical system for synthesizing the images from each of the color lights from the plurality of liquid crystal display devices, the color synthesizing optical system comprising an odd-number reflection optical path wherein an image of a color light from one liquid crystal display device of the plurality of liquid crystal display devices reflects an odd number of times on an optical path leading from the one liquid crystal display device to a projection optical system; and an even-number reflection optical path wherein an image of a color light from another liquid crystal display device of the plurality of liquid crystal display devices is non-reflective or reflects an even number of times on an optical path leading from the another liquid crystal display device to a projection optical system; and a projection optical system for projecting an image synthesized by the color synthesizing optical system; wherein at least one optical system of the illumination optical system and the projection optical system has different f-numbers at a plurality of directions from the at least one optical system, according to contrast properties of each direction of the liquid crystal display device and the reflection optical paths of the color synthesizing optical system.

The at least one optical system may be the illumination optical system; with a first f-number of the illumination optical system being greater than a second f-number of the illumination optical system; with the first f-number being an f-number of the illumination optical system in a direction matching the direction of the liquid crystal display device for first contrast properties, and with the second f-number being an f-number of the illumination optical system in a direction matching the direction of the liquid crystal display device for second contrast properties with contrast properties higher than the first contrast properties.

The at least one optical system may be the projection optical system; with a first f-number of the projection optical system being greater than a second f-number of the projection optical system; with the first f-number being an f-number of the projection optical system in a direction matching the direction of the liquid crystal display device for first contrast properties; and with the second f-number being an f-number of the projection optical system in a direction matching the direction of the liquid crystal display device for second contrast properties with contrast properties higher than the first contrast properties.

A first f-number of the illumination optical system may be greater than a second f-number of the illumination optical system, the first f-number being an f-number of the illumination optical system in a direction matching the direction of the liquid crystal display device for first contrast properties, the second f-number being an f-number of the illumination optical system in a direction matching the direction of the liquid crystal display device for second contrast properties with contrast properties higher than the first contrast properties; and a first f-number of the projection optical system being greater than a second f-number of the projection optical system; the first f-number being an f-number of the projection optical system in a direction matching the direction of the liquid crystal display device for first contrast properties, and the second f-number being an f-number of the projection optical system in a direction matching the direction of the liquid crystal display device for second contrast properties with contrast properties higher than the first contrast properties.

An optical axis of the projection optical system and a center of the liquid crystal display device may be offset.

According to a fourth aspect of the present invention, a projector-type image display device comprises: a liquid crystal display device for forming an image; an illumination optical system for guiding light from a light source to the liquid crystal display device; a projection optical system for projecting an image formed by the liquid crystal display device; and a diaphragm member disposed on at least one of the illumination optical system and the projection optical system, wherein an aperture is formed in the diaphragm member, and wherein the width of the aperture differs for each direction the aperture faces.

According to a fifth aspect of the present invention, a projector-type image display device comprises: a plurality of liquid crystal display devices which each form images; an illumination optical system for dividing light from a light source into a plurality of different color lights, and illuminating each of the liquid crystal display devices with a matching color light; a color synthesizing optical system for synthesizing the images from each of the color lights from the plurality of liquid crystal display devices, the color synthesizing optical system comprising an odd-number reflection optical path wherein an image of a color light from one liquid crystal display device of the plurality of liquid crystal display devices reflects an odd number of times on an optical path leading from the one liquid crystal display device to a projection optical system, and an even-number reflection optical path wherein an image of a color light from another liquid crystal display device of the plurality of liquid crystal display devices is non-reflective or reflects an even number of times on an optical path leading from the another liquid crystal display device to a projection optical system; a projection optical system for projecting an image synthesized by the color synthesizing optical system; and a diaphragm member disposed on at least one optical system of the illumination optical system and the projection optical system, wherein an aperture is formed in the diaphragm member, and the width of the aperture differs for each direction the aperture faces.

The liquid crystal display device may have a rectangular display portion with a width of the aperture of the aperture of the diaphragm member in the diagonal direction as to the long side direction of the rectangular display portion being shorter than a width of the aperture in the direction matching the long side direction and short side direction of the rectangular display portion.

A size of the aperture of the diaphragm member may be variable.

An optical axis of the projection optical system and a center of the liquid crystal display device may be offset.

Further objects, features and advantages of the present invention will become apparent from the following description of the preferred embodiments (with reference to the attached drawings).

BRIEF DESCRIPTION OF THE DRAWINGS

FIG. 3A is a principal component cross-sectional view of a third embodiment of the present invention.

FIG. 3B is a side view of the arrangement in FIG. 3A from the direction B.

FIG. 4 is a frontal view of a diaphragm used with the present invention.

DESCRIPTION OF THE PREFERRED EMBODIMENTS

First, description will be made regarding the contrast/view-angle properties of the liquid crystal display device (liquid crystal panel) used in the projection-type image display devices serving as a liquid crystal projector, according to the present embodiment.

Figure 5:
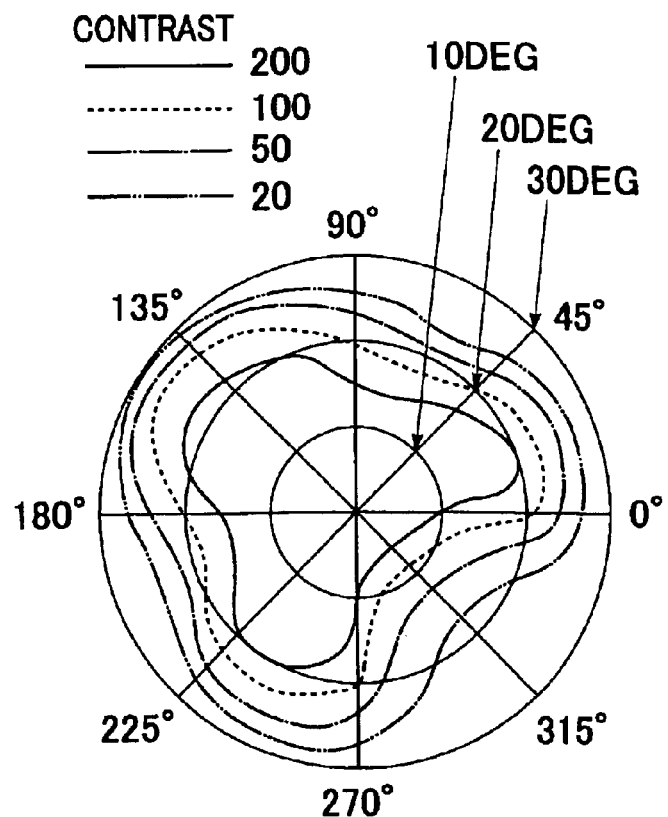
FIG. 5 is an explanatory diagram of contrast/view-angle properties of a common liquid crystal panel.

FIG. 5 is an explanatory diagram of an example of measurement values for the contrast/view-angle properties for the liquid crystal (liquid crystal panel) used with the liquid crystal projector.

Figure 6:
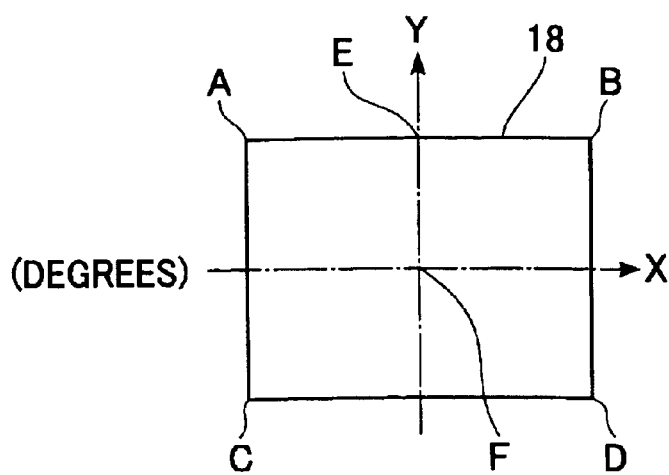
FIG. 6 is an explanatory diagram indicating the direction of a liquid crystal panel corresponding to the contrast/view-angle properties in FIG. 5.

The contrast/view-angle properties shown in FIG. 5 have been measured at the light output side of the liquid crystal panel 18 shown in FIG. 6 (the faces indicated by A, B, C, and D in FIG. 6). Measurement of the contrast/view-angle properties of the liquid crystal panel 18 is obtained as the result of measuring contrast, from the ratio between the quantity of transmitted light and the quantity of non-transmitted light upon placing polarizing plates at the light input side and light output side of the liquid crystal panel 18 and turning the voltage applied to the liquid crystal on and off. Now, the polarization axis of the polarizing plate provided at the light input side is in the vertical direction to the drawing (i.e., the Y direction) in FIG. 6, and the polarization axis of the polarizing plate provided at the light output side (the faces indicated by A, B, C, and D in FIG. 6) is in the horizontal direction to the drawing (i.e., the X direction) in FIG. 6.

The contrast/view-angle properties shown in FIG. 5 are shown with the X direction as 0°, proceeding in a counter-clockwise direction. Examples of the view angle are 10°, 20°, and 30°, each indicating view angles where the contrast is 20, 50, 100, and 200.

In FIG. 5, the light solid line connects the emission angles in each direction from the liquid crystal panel 18 with a contrast of 200. In the same way, the light dotted line indicates the emission angles with a contrast of 100, the single-dot broken line, 50, and the double-dot broken line, 20.

As shown in FIG. 5, the contrast/view-angle properties differ greatly according to the viewing direction from the center F of the display portion (effective display range) of the liquid crystal panel 18. With the case of this liquid crystal panel 18 used for measurement, the contrast viewed from the direction 315°, which is the lower right direction of the drawing, is the poorest contrast. This shows that there is most light leakage in displaying the color black when viewing the liquid crystal panel 18 from the lower right side in the drawing.

The fly-eye lens plate used for the liquid crystal projector illumination optical system is a configuration wherein multiple lens pieces which are approximately similar figures with the form of the display face of the liquid crystal panel are arrayed two-dimensionally, so that the overall form of the fly-eye lens plate is approximately square. Accordingly, in the event that this fly-eye lens plate is used in the illumination optical system of the liquid crystal panel having the properties shown in FIG. 5, the illumination optical system f-number will be the brightest (smallest f-number) in the diagonal direction of the liquid crystal panel. Accordingly, in this case, contrast irregularities will readily occur since the incident angle of the illumination light is the greatest in the direction where the contrast/view-angle properties of the liquid crystal panel are the poorest.

Also, with liquid crystal projectors, normally, the positional relation between the projection lens and the liquid crystal panel is set such that the optical axis of the projection lens is positioned near the upper end E of the short side direction of the liquid crystal panel 18 shown in FIG. 6, for example, so as to project an image on a screen which is above the optical axis of the projecting lens.

With projection lenses of liquid crystal projectors, the vignetting becomes more pronounced the closer to the perimeter thereof, and at the perimeter of the projection lens the pupil shape is elliptic, so the quantity of light at the perimeter is around 50%. Accordingly, the vignetting (pupil-shape) of the projection lens differs at each of the positions A, B, C, and D, at the four corners within the effective range of the liquid crystal panel 18.

Figure 7:
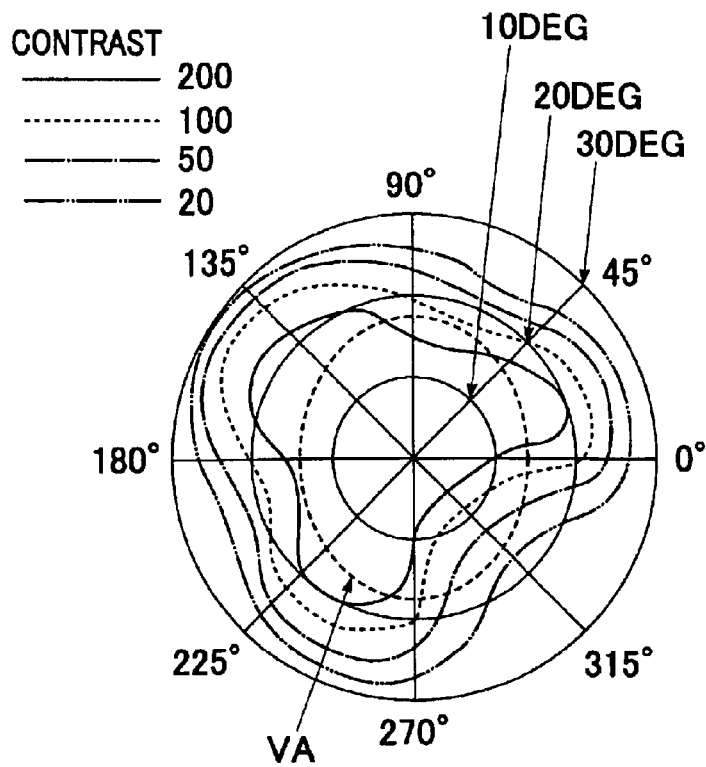
FIG. 7 is an explanatory diagram wherein an angle corresponding to the vignetting of the projection lens in the event that the liquid crystal panel is at the position A is superimposed on the contrast/view-angle properties in FIG. 5.

FIG. 7 is an explanatory diagram superimposing the vignetting (pupil-shape) VA viewing the entrance pupil of the projection lens from the position A on the liquid crystal panel 18 shown in FIG. 6 on the contrast/view-angle properties diagram shown in FIG. 5, corresponding to the angles of the properties diagram in FIG. 5. As shown in FIG. 6, the point A is at the left direction in the drawing as to the intersection E between the optical axis of the projection lens and the liquid crystal panel 18. Accordingly, the vignetting (pupil-shape) VA at point A is an ellipse wherein the vertical angle in the drawing is great as to the horizontal direction in the drawing as shown in FIG. 7.

Figure 8:
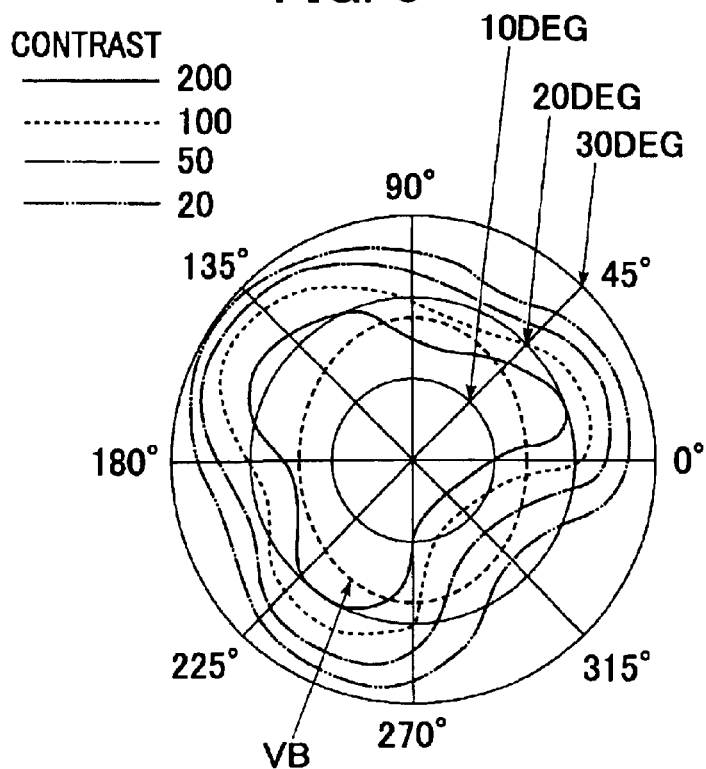
FIG. 8 is an explanatory diagram wherein an angle corresponding to the vignetting of the projection lens in the event that the liquid crystal panel is at the position B is superimposed on the contrast/view-angle properties in FIG. 5.

FIG. 8 is an explanatory diagram superimposing the vignetting (pupil-shape) VB viewing the entrance pupil of the projection lens from the position B on the liquid crystal panel 18 shown in FIG. 6 on the contrast/view-angle properties diagram shown in FIG. 5, corresponding to the angles of the properties diagram in FIG. 5. As shown in FIG. 6, the point B is at the right direction in the drawing as to the intersection E between the optical axis of the projection lens and the liquid crystal panel 18. Accordingly, the vignetting (pupil-shape) VB at point B is an ellipse wherein the vertical angle in the drawing is great as to the horizontal direction in the drawing, as shown in FIG. 8.

The vignetting at position A and position B on the liquid crystal panel has the same form, so in principle, contrast irregularities will not occur.

Figure 9:
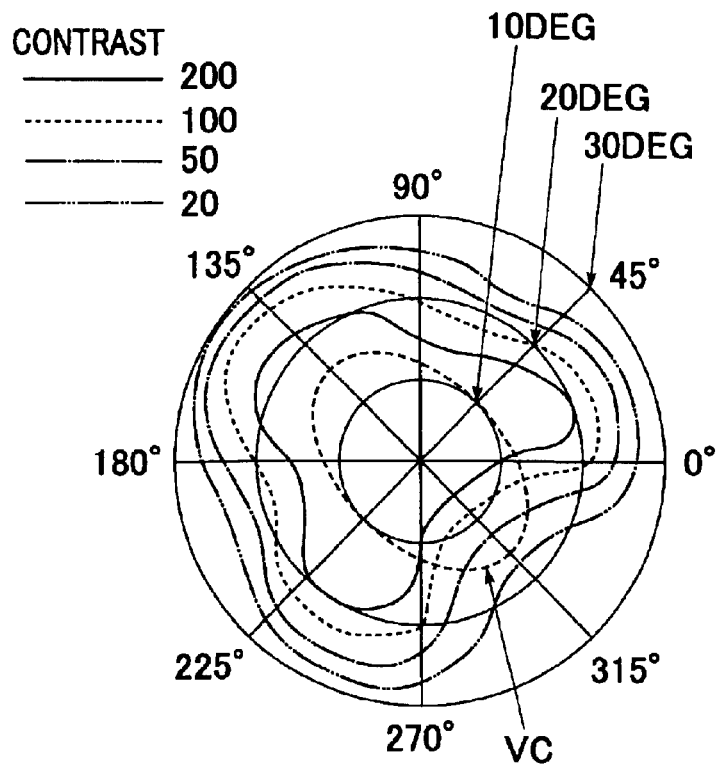
FIG. 9 is an explanatory diagram wherein an angle corresponding to the vignetting of the projection lens in the event that the liquid crystal panel is at the position C is superimposed on the contrast/view-angle properties in FIG. 5.

FIG. 9 is an explanatory diagram superimposing the vignetting (pupil-shape) VC viewing the entrance pupil of the projection lens from the position C on the liquid crystal panel 18 shown in FIG. 6 on the contrast/view-angle properties diagram shown in FIG. 5, corresponding to the angles of the properties diagram in FIG. 5. As shown in FIG. 6, the point C is at the lower left direction in the drawing as to the intersection E between the optical axis of the projection lens and the liquid crystal panel 18. Accordingly, the vignetting (pupil-shape) VC at point C is an ellipse with the major axis in the upper left direction of the drawing, as shown in FIG. 9.

Figure 10:
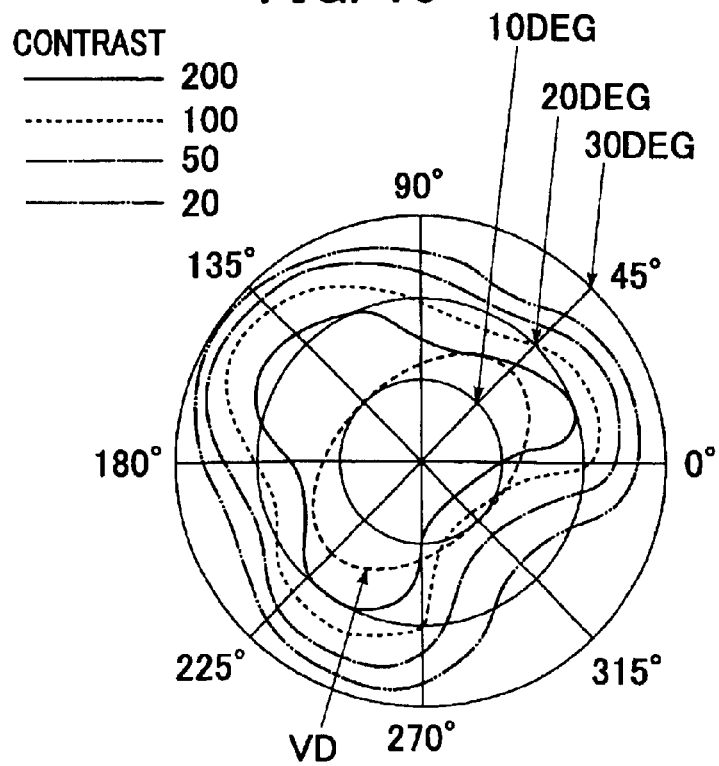
FIG. 10 is an explanatory diagram wherein an angle corresponding to the vignetting of the projection lens in the event that the liquid crystal panel is at the position D is superimposed on the contrast/view-angle properties in FIG. 5.

FIG. 10 is an explanatory diagram superimposing the vignetting (pupil-shape) VD viewing the entrance pupil of the projection lens from the position D on the liquid crystal panel 18 shown in FIG. 6 on the contrast/view-angle properties diagram shown in FIG. 5, corresponding to the angles of the properties diagram in FIG. 5. As shown in FIG. 6, the point D is at the lower right direction in the drawing as to the intersection E between the optical axis of the projection lens and the liquid crystal panel 18. Accordingly, the vignetting (pupil-shape) VD at point D is an ellipse with the major axis in the upper right direction of the drawing, as shown in FIG. 10.

Let us compare the contrast/view-angle properties in the range of the vignetting VC shown in FIG. 9, and the contrast/view-angle properties in the range of the vignetting VD shown in FIG. 10. The area of poor contrast/view-angle properties in the range of the vignetting VC shown in FIG. 9 (i.e., the area where the portions of contrast of 100, 50, and 20 occupy) is greater than the area of poor contrast/view-angle properties in the range of the vignetting VD shown in FIG. 10 (i.e., the area where the portion of contrast of 100 occupies). Accordingly, the light leakage when displaying the color black at the position on the screen corresponding to the position C on the liquid crystal panel shown in FIG. 6 is greater than the light leakage when displaying the color black at the position on the screen corresponding to the position D on the liquid crystal panel, consequently exhibiting contrast irregularities.

Accordingly, in the event of performing tricolor synthesis using three liquid crystal panels with the above properties in a color liquid crystal projector or the like, and displaying color images on a screen, color irregularities occur in the projected image when displaying the color black.

This occurs due to the following fact. Even in a case wherein three liquid crystal panels with the same view angle properties with regard to contrast are used, in the event that the number of times of reflection differ among the color optical paths in the color synthesizing optical system, the portion of the screen of the liquid crystal panel where there is the most light leakage when displaying black is inverted.

That is to say, color irregularities when displaying the color black in a 3-LCD liquid crystal projector occur if all of the following three conditions are present:

(1) Different contrast/view-angle properties according to direction on liquid crystal panel.
(2) Different number of times of reflection for each color channel (color optical path) of the color synthesizing system (i.e., odd, zero, or even).
(3) Different vignetting for entrance pupil of projection lens depending on position within display screen of liquid crystal panel (optical axis of projection lens is offset from center of display of liquid crystal panel).

As described above, liquid crystal panels have contrast/view-angle properties, and in the event that such liquid crystal panels are used, irregularities in brightness and color occur depending on the direction of the projected image.

Accordingly, with the image display device according to the present embodiment, in at least one optical system of the illumination optical system and the projection optical system, the f-numbers of the optical system are different f-numbers at each direction orthogonal to the optical axis of the optical system, corresponding to the direction of the contrast/view-angle properties of the liquid crystal panel.

As for the configuration wherein the f-numbers of the optical system are different f-numbers at each direction orthogonal to the optical axis of the optical system, a diaphragm member, with an aperture formed therein, is disposed on at least one optical system of the illumination optical system and the projection optical system. The aperture of the diaphragm member has a shape such that the f-numbers at multiple directions at the aperture are different f-numbers, according to contrast/view-angle properties of each direction of the liquid crystal device.

The present embodiment is arranged such that the f-numbers are different for at least one of the illumination optical system and the projection optical system, corresponding to the contrast/view-angle properties in each direction of the liquid crystal panel, even in the event of using a color liquid crystal projector wherein the color synthesizing optical system which synthesizes the color images modulated at multiple liquid crystal panels has an odd-number reflection optical path wherein the color light reflects an odd number of times on the optical path from one of the liquid crystal panels to the projection optical system, and an even-number reflection optical path wherein the color light does not reflect (0 times reflection) or reflects an even number of times on the optical path from one of the liquid crystal panels to the projection optical system. With the present embodiment, a configuration wherein the lens diameter of the lenses making up the illumination optical system or projecting lens is changed, or a configuration wherein a diaphragm with a suitable shape for an aperture is provided, is used.

Next, there will be a description of the projection-type image display device according to the present embodiment.

Figure 1A:
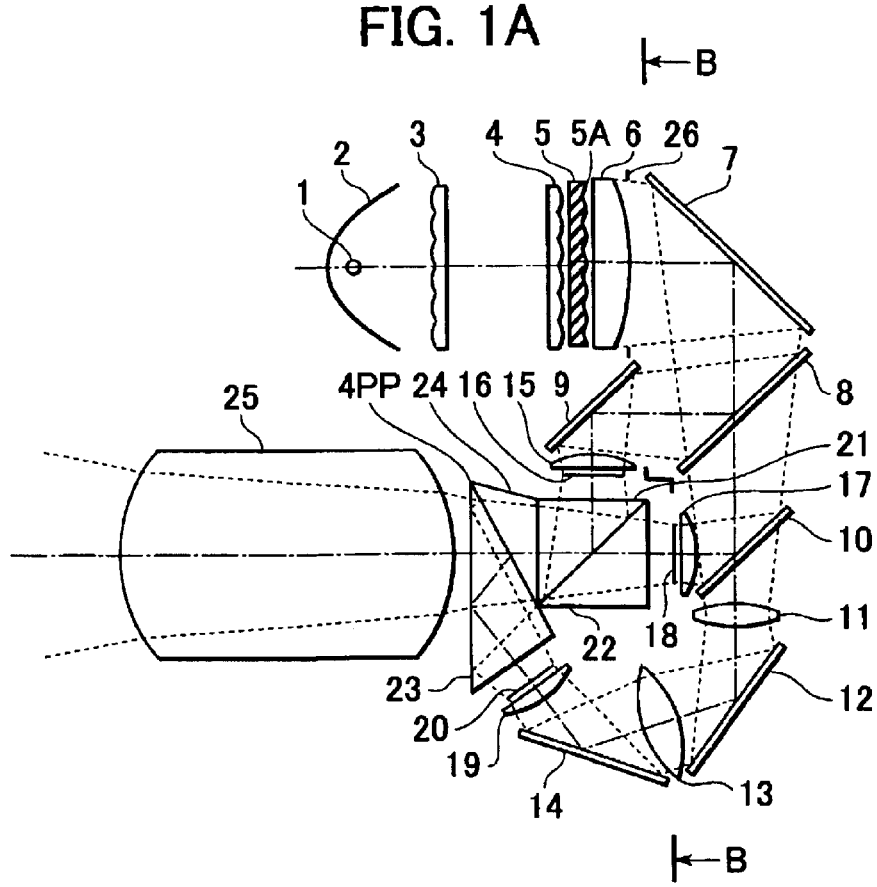
FIG. 1A is a principal component cross-sectional view of a first embodiment of the present invention.

FIG. 1A is a principal component cross-sectional view of a projection-type image display device of a first embodiment of the present invention. In FIG. 1A, white light emitted from light source means 1 is converted into approximately parallel light fluxes by a parabolic mirror 2. The approximately parallel light fluxes are cast into a first fly-eye lens 3 configured of an array of multiple rectangular lenses, and the light fluxes are formed as light source images at approximately the center portion of each piece of a second fly-eye lens 4 configured of an array of multiple rectangular lenses. Each light flux is aligned with only one polarization component by a polarizing device. Further, the light fluxes pass through a first convex lens 6, and dichroic mirrors and lenses, and are cast on liquid crystal panels 16, 18, and 20, which are image modulating means.

As described above, the light from the first convex lens 6 is reflected at the mirror 7, and cast into a blue-reflection dichroic mirror 8. The blue light reflected at the blue-reflection dichroic mirror 8 is reflected at a high-reflectance mirror 9 and a second convex lens 15, and is condensed on the display portion of the blue color liquid crystal display panel 16 (blue channel).

Also, as for the green and red light components which have been transmitted through the blue-reflection dichroic mirror 8, the green component is reflected by a dichroic mirror 10 for reflecting green light, and passes through a third convex lens 17 and is condensed on the display portion of the green liquid crystal panel 18 (green channel).

Further, the red component light which has been transmitted through the dichroic mirror 10 passes through a fourth convex lens 11, high-reflectance mirror 12, fifth convex lens 13, high-reflectance mirror 14, and sixth convex lens 19, and is condensed on the display portion of the red liquid crystal panel 20 (red channel). Note that the fourth convex lens 11 and fifth convex lens 13 serve as approximate equal-power imaging relay lenses, since the red channel has a longer optical path than the other colors.

Now, the members 8 through 15, 17, and 19 make up a component of the color separation optical system. Also, with the present embodiment, an arrangement may be made wherein light source means are provided for each color, so as to illuminate the corresponding liquid crystal panels. The members situated on the optical path from the light source 1 to each liquid crystal panel make up one component of the illumination optical system.

The light modulated at the liquid crystal panels 16, 18, and 20, for each color, is color-synthesized at a color synthesizing prism 4PP made up of a first prism 23, a second prism 24, a third prism 21, and a fourth prism 22. The synthesized light is projected onto an unshown screen by a projecting lens 25, as a color image.

Dichroic film which reflects red light component and transmits blue and green components is formed on the composition surface between the prism 23 and the prism 24 making up the color synthesizing prism 4PP. Also, dichroic film which reflects blue light component and transmits green components is formed on the composition surface between the prism 21 and the prism 22 making up the color synthesizing prism 4PP. Note that a known arrangement of three prisms may be used for the color synthesizing prism in the present embodiment.

Figure 1B:
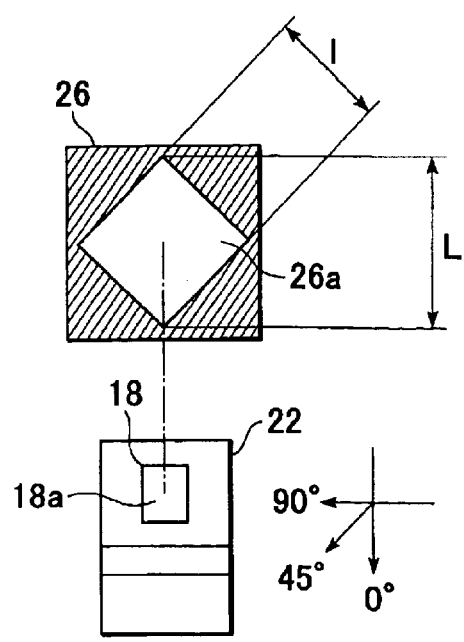
FIG. 1B is a side view of the arrangement in FIG. 1A from the direction B.

A diaphragm member 26 is positioned between the aforementioned first convex lens 6 and the high-reflectance mirror 7. FIG. 1B is a side view illustrating the diaphragm member 26 and the liquid crystal panel 18 from the direction B in FIG. 1A, showing the form of the diaphragm 26.

As shown in FIG. 1B, the diaphragm member 26 is a square, with an aperture 26a rotated 45° on the optical axis as to the long side direction of the liquid crystal panels 16, 18, and 20. Arranged so that the directional angle downwards from the center 18a of the liquid crystal panel 18 is 0° and rotating in the clockwise direction increases the angle, the configuration is laid out such that the f-number (brightness) of the illumination optical system in the direction angles of 45°, 135°, 225°, and 315°, is greater (darker) than the f-number of the direction angles 0° and 90° of the liquid crystal panel 18. That is to say, the aperture 26a of the diaphragm member 26 is arranged such that the width L of the aperture parallel to the long side direction (short side direction) of the liquid crystal panel 18 is greater than the width 1 of the aperture rotated 45° from the long side direction of the liquid crystal panel 18.

In this way, with the present embodiment, inserting the diaphragm member 26 causes the f-number of the illumination optical system in the direction 315° where the contrast in the contrast/view-angle properties of the liquid crystal panel is the poorest (first contrast) to be greater than the f-number of the illumination optical system in the direction where the contrast in the contrast/view-angle properties is good (second contrast, higher than the first contrast).

This is because, as shown in FIG. 5, the contrast/view-angle properties of the liquid crystal panel 18 are particularly poor at the direction 315° of the liquid crystal panel (first contrast), and in the illumination optical system, the number of times of reflection on the optical path between the diaphragm member 26 to the liquid crystal panel 18 is three times for the blue liquid crystal panel 16, which is an odd number, while this is twice for the green liquid crystal panel 18 which is an even number, so the diaphragm member 26 as viewed from the blue liquid crystal panel 16 has been horizontally inverted with regard to the long side direction of the liquid crystal panel, as compared to being viewed from the green liquid crystal panel 18.

Accordingly, in the event of using liquid crystal panels having the same contrast/view-angle properties for the green liquid crystal panel 18 and the blue liquid crystal panel 16, light cannot be shielded for portions of the liquid crystal panel 16 where contrast in the contrast/view-angle properties is poor in the event that a diaphragm member 26 is provided with a horizontally nonsymmetrical aperture which shields only light for portions of the green liquid crystal panel 18 where contrast in the contrast/view-angle properties is poor (first contrast). Accordingly, a horizontally symmetrical aperture is provided to the diaphragm member 26.

Also, the number of times of reflection from the diaphragm member 26 to the red liquid crystal panel 20 is three times, which is an odd number (horizontal inversion), and approximate equal-power imaging is performed by the fourth convex lens 11, fifth convex lens 13, and sixth convex lens 19 (horizontal and vertical inversion), so the diaphragm member 26 with regard to the red liquid crystal panel 20 is inverted vertically as viewed from the red liquid crystal panel 20. Accordingly, the diaphragm member 26 is formed with a vertically symmetrical aperture as well, in the event that the long side direction of the liquid crystal panel is the horizontal direction.

In this way, the diaphragm member 26 has an aperture of a shape which is horizontally and vertically symmetrical with the optical axis of the illumination optical system as the center thereof. Thus, illumination light from the portions where the contrast/view-angle properties are poor (first contrast) for each color liquid crystal panel is shielded, and accordingly, illumination light can be cast into each liquid crystal panel at the same angle.

Consequently, even in the event that the liquid crystal panels have properties wherein the contrast/view-angle properties differ according to the directional angle, a black display screen image with no irregularities in contrast and color can be obtained.

Also, with the color synthesizing prism 4PP, there is one reflection (horizontal inversion) from the blue liquid crystal panel 16 to the unshown screen, and projection is made by the projection lens 25 (horizontal and vertical inversion), so the result is only vertical inversion. There are zero reflections (no horizontal inversion) from the green liquid crystal panel 18 to the unshown screen, and projection is made by the projection lens 25 (horizontal and vertical inversion), so the result is only horizontal and vertical inversion. There are two reflections (no horizontal inversion) from the red liquid crystal panel 20 to the unshown screen, and projection is made by the projection lens 25 (horizontal and vertical inversion), so the result is only horizontal and vertical inversion.

Accordingly, with devices not using the diaphragm member 26 according to the present embodiment, only the blue liquid crystal panel 16 is horizontally inverted as compared with the other liquid crystal panels, so in the event of using three liquid crystal panels having approximately the same contrast/view-angle properties, with different contrast properties depending on the directional angle of the liquid crystal panel, portions on the screen with much light leakage during the display of the color black are horizontally inverted, thereby generating color irregularities.

More specifically, with a point on the unshown screen which corresponds to the point C where there is much light leakage when displaying the color black on the liquid crystal panel 18 shown in FIG. 6, the green liquid crystal panel 18 is reflected zero times at the color synthesizing prism 4PP and the red liquid crystal panel 20 is reflected twice at the color synthesizing prism 4PP, so this is at the upper left when viewed from the projector side, and the green and red at the upper left on the screen mix to form yellow. On the other hand, the blue liquid crystal panel 16 is reflected once at the color synthesizing prism 4PP and accordingly is horizontally inverted, so the position on the screen corresponding to the point C where there is much light leakage when displaying the color black is at the upper right.

Thus, with devices not provided with the diaphragm member 26, using liquid crystal panels with contrast/view-angle properties such as shown in FIG. 5 results in color irregularities wherein the upper left of the screen is yellow and the upper right is blue.

Next, description will be made regarding the properties of a configuration using the diaphragm member with the image display device according to the present embodiment.

Figure 11:
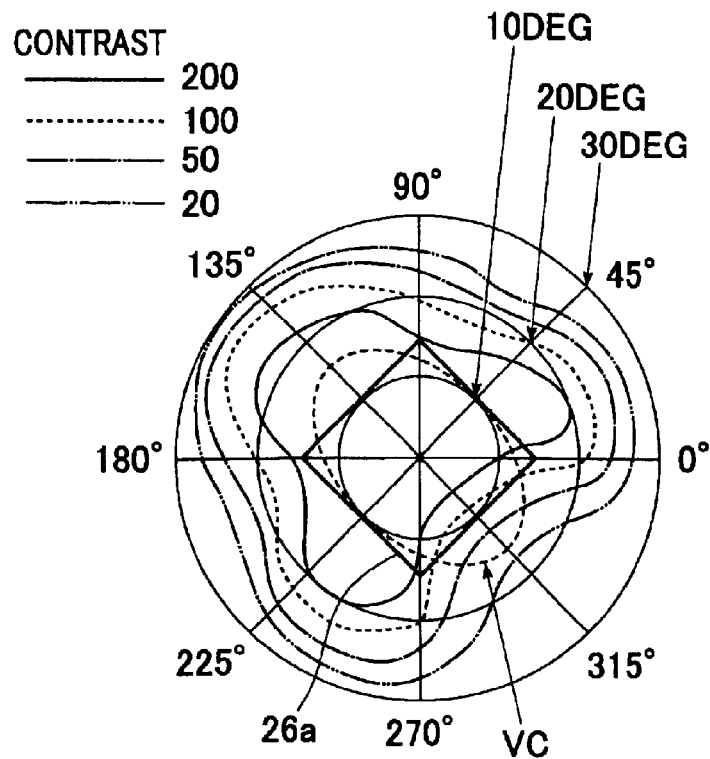
FIG. 11 is an explanatory diagram wherein an angle corresponding to the vignetting of the projection lens in the event that the liquid crystal panel is at the position C, and the angle corresponding to the aperture of the diaphragm 26 are superimposed on the contrast/view-angle properties in FIG. 5.

FIG. 11 is a diagram wherein the contrast/view-angle properties between the aperture 26a of the diaphragm member 26 according to the present embodiment shown in FIGS. 1A and 1B and the liquid crystal panel 18, and the vignetting VC of the projection lens at the point C on the liquid crystal panel shown in FIG. 6, are superimposed in a manner aligned with the direction of the liquid crystal panel.

Figure 12:
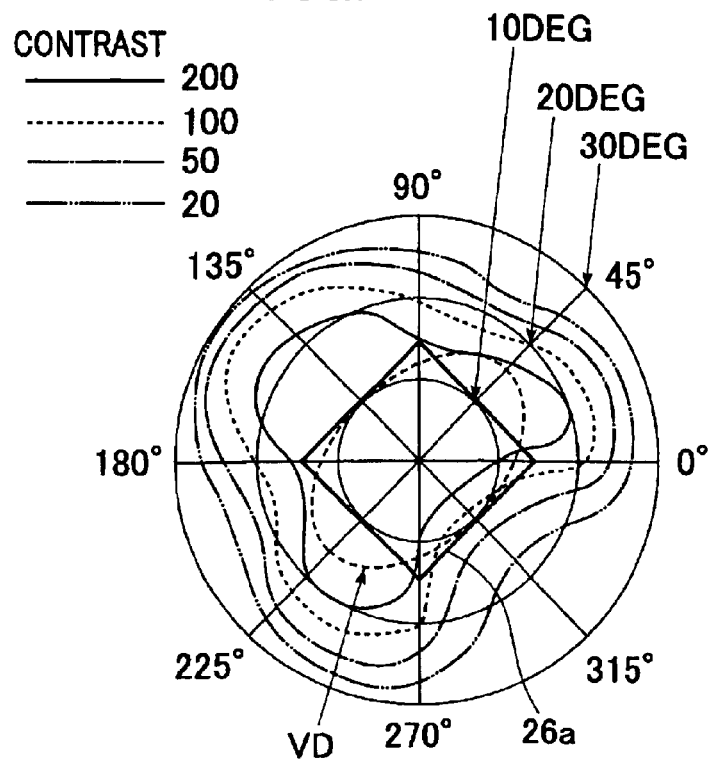
FIG. 12 is an explanatory diagram wherein an angle corresponding to the vignetting of the projection lens in the event that the liquid crystal panel is at the position D, and the angle corresponding to the aperture of the diaphragm 26 are superimposed on the contrast/view-angle properties in FIG. 5.

FIG. 12 is a diagram wherein the contrast/view-angle properties between the aperture 26a of the diaphragm member 26 according to the present embodiment shown in FIGS. 1A and 1B and the liquid crystal panel 18, and the vignetting VD of the projection lens at the point D on the liquid crystal panel shown in FIG. 6, are superimposed in a manner aligned with the direction of the liquid crystal panel.

With the present embodiment, illumination light from the portion with poor contrast (first contrast) in the contrast/view-angle properties within the range of vignetting of the projection lens shown in FIG. 11 is shielded by the diaphragm member 26 being provided, so there is little light leakage when displaying black at the point C on the liquid crystal panel, and contrast irregularity decreases.

In FIG. 12, the area of the portion with poor contrast (first contrast) in the contrast/view-angle properties within the range of vignetting of the projection lens is small, so even in the event that the diaphragm member 26 is provided, there is little change in the light leakage when displaying the color black at the point D on the liquid crystal panel 18.

Accordingly, with the present embodiment, the amount of light leakage when displaying the color black is approximately the same for point C and point D on the liquid crystal panel 18 as shown in FIGS. 11 and 12, due to providing the diaphragm member 26 having the aperture 26a in the illumination optical system, so approximately the same contrast is obtained over the entire screen region, and contrast irregularities in the liquid crystal display range can be reduced. Accordingly, the brightness on each liquid crystal panel at the time of displaying the color black is approximately uniform within the screen, so color irregularities in the screen image can be reduced.

Also, the present embodiment may be configured such that a diaphragm member is provided in the optical path for the projection lens (projection optical system) 25 (as an aperture diaphragm at the pupil position of the projection lens), instead of providing the diaphragm member 26 in the optical path of the illumination optical system, so that the f-number of the projection optical system differs according to the contrast/view-angle properties of the liquid crystal panel.

Also, with the present embodiment, the diaphragm member may be provided to both the illumination optical system and the projection optical system. Further, the shape of the diaphragm member and/or the size thereof (area of aperture) may be made to be variable. Also, an arrangement may be made wherein an ND filter or a like optical filter (a filter wherein an aperture is formed in the same manner as the diaphragm member) is used instead of the diaphragm member, so that the f-numbers for each direction orthogonal to the optical axis of at least one of the illumination optical system and projection optical system differ according to the direction of the contrast/view-angle properties of the liquid crystal panel.

Further, with the present embodiment, an arrangement may be made wherein the outer form of the lens or a part of the lenses making up the illumination optical system or the projection optical system (i.e., an optical system wherein the form of the lens is configured in the same shape as the aperture of the diaphragm member) is changed according to the direction of the contrast/view-angle properties of the liquid crystal panel, so that the f-numbers for each direction orthogonal to the optical axis of at least one of the illumination optical system and projection optical system differ.

Figure 2A:
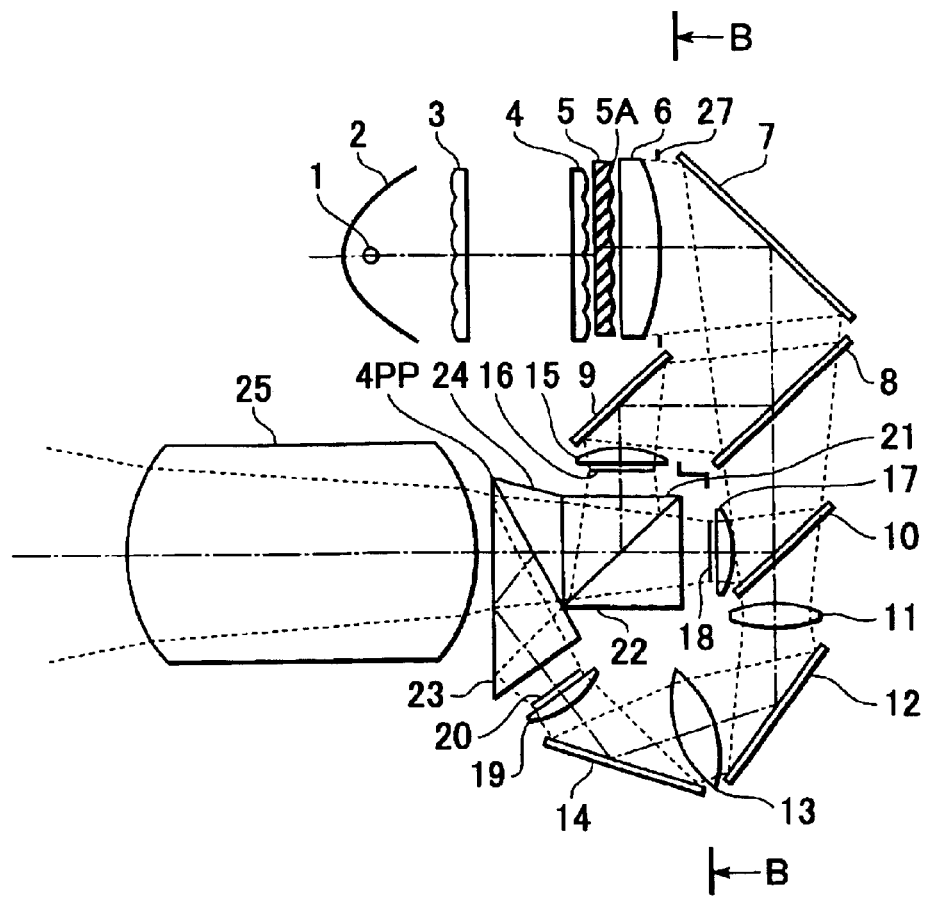
FIG. 2A is a principal component cross-sectional view of a second embodiment of the present invention.

FIG. 2A is a principal component cross-sectional view of a second embodiment of the present invention. The second embodiment is almost the same configuration as that shown in FIGS. 1A and 1B, but the shape of the aperture of the diaphragm 27 is different from that shown in FIG. 1B, as illustrated in FIG. 2B.

The second embodiment uses a diaphragm member 27 with a star-shaped aperture 27a (a shape wherein the sides of the aperture bulge inward as arc-shaped sides) which is optimized for the shape of the contrast/view-angle properties of the liquid crystal panel.

Figure 2B:
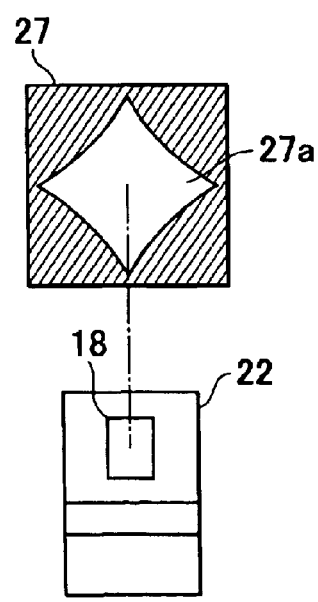
FIG. 2B is a side view of the arrangement in FIG. 2A from the direction B.

With the second embodiment, forming the diaphragm member 27 with a star-shaped aperture 27a as shown in FIG. 2B, enables the f-number of the illumination optical system, where the contrast in the contrast/view-angle properties of the liquid crystal panel is poor (first contrast), to be even greater than the f-number of the illumination optical system, where the contrast in the contrast/view-angle properties is good (second contrast). Accordingly, with the second embodiment, the contrast irregularities and color irregularities can be reduced even further than the first embodiment shown in FIGS. 1A and 1B.

FIG. 3A is a principal component cross-sectional view of a projection-type image display device according to a third embodiment of the present invention.

With the third embodiment, the diaphragm member 28 is disposed within the projection lens 25, as shown in FIGS. 3A and 3B. Thus, the f-number value of the projection lens is changed corresponding to the contrast/view-angle properties of the liquid crystal panel, thereby improving contrast irregularities and color irregularities. As shown in FIG. 3B, an aperture 28a with a shape wherein the f-number is the greatest is provided to the diaphragm member 28, rotated 45° as to the long side direction of the liquid crystal panel 18, as shown in FIG. 3B. The optical axis of the projection lens 25 (diaphragm member 28) according to the present embodiment is at a position offset from the center of the liquid crystal panel 18. This is in order to project the screen projection image above the optical axis of the projection lens.

With the third embodiment, disposing the diaphragm member 28 in the projection lens (projection optical system) 25 causes the f-number of the projection optical system, where the contrast in the contrast/view-angle properties of the liquid crystal panel 18 is poor (first contrast), to be greater than the f-number of the projection optical system, where the contrast in the contrast/view-angle properties is good (second contrast). Accordingly, with the present embodiment, the contrast irregularities and color irregularities can be reduced as with the above embodiments.

Next, the diaphragm member of an image display device according to another embodiment will be described. FIG. 4 is a schematic diagram of a diaphragm member according to another embodiment. The diaphragm member 29 according to the present embodiment has a configuration wherein diaphragm plates 30a and 30b mutually move, so that the size of the aperture thereof 29a (i.e., the area of the aperture) changes.

The diaphragm member 29 according to the present embodiment consists of two diaphragm plates 30a and 30b, and the size of the aperture 29a can be changed by moving the diaphragm plates 30a and 30b in mutually opposing directions (vertically in FIG. 4).

Now, while a configuration has been described with the embodiment shown in FIG. 4 wherein the size of the aperture 29a of the diaphragm 29 is changed, an arrangement may be made wherein a diaphragm device uses multiple movable diaphragm blades, moving the diaphragm blades so as to change either one or both of the size (area) of the aperture and the shape thereof.

The above-described diaphragm member 29 is provided to at least one of the illumination optical system and projection optical system, or both, as with the configuration shown in FIG. 1A. In the event that the brightness of the image projected by the image display device is to be given priority, the aperture of the diaphragm is opened, and in the event that the contrast of the image projected by the image display device is to be given priority, the aperture is reduced. Further, in the event of balancing the brightness and the contrast of the image projected by the image display device, the brightness and the contrast of the image can be adjusted by setting the aperture of the diaphragm to an intermediate opening.

Now, while the above-described embodiments have been described with reference to a 3-LCD projection-type display device which projects color images, the present invention can also be applied to a single-LCD (a configuration which only uses one liquid crystal panel) monochromatic or color image projection-type display device.

According to the above-described embodiments, the contrast irregularities and the color irregularities that occur during the display of the color black in an image that has been formed using liquid crystal panels and projected, can be reduced. Accordingly, a projection type image display apparatus yielding an excellent projected image can be provided.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A projector-type image display device comprising:
   a liquid crystal display device for forming an image;
   an illumination optical system for illuminating said liquid crystal display device with light from a light source;
   a projection optical system for projecting an image from said liquid crystal display device; and
   a diaphragm member disposed on at least one optical system of said illumination optical system and said projection optical system,
   wherein an aperture is formed in said diaphragm member, and
   wherein said aperture has a shape such that f-numbers at a plurality of directions from said at least one optical system are different f-numbers, according to contrast properties of each direction of said liquid crystal display device.

2. A projector-type image display device according to claim 1,
   wherein said diaphragm member is disposed at said illumination optical system,
   wherein said aperture of said diaphragm member has a shape such that a first f-number of said illumination optical system is greater than a second f-number of said illumination optical system,
   wherein said first f-number is an f-number of said illumination optical system in a direction matching the direction of said liquid crystal display device for first contrast properties, and
   wherein said second f-number is an f-number of said illumination optical system in a direction matching the direction of said liquid crystal display device for second contrast properties with contrast properties higher than said first contrast properties.

3. A projector-type image display device according to claim 1,
   wherein said diaphragm member is disposed at said projection optical system,
   wherein said aperture of said diaphragm member has a shape such that a first f-number of said projection optical system is greater than a second f-number of said projection optical system,
   wherein said first f-number is an f-number of said projection optical system in a direction matching the direction of said liquid crystal display device for first contrast properties, and
   wherein said second f-number is an f-number of said projection optical system in a direction matching the direction of said liquid crystal display device for second contrast properties with contrast properties higher than said first contrast properties.

4. A projector-type image display device according to claim 1, said diaphragm member comprising
   a first diaphragm member disposed at said illumination optical system, and
   a second diaphragm member disposed at said projection optical system,
   wherein a first aperture is formed in said first diaphragm member, a second aperture is formed in said second diaphragm member, and said first aperture has a shape such that a first f-number of said illumination optical system is greater than a second f-number of said illumination optical system,
   wherein said first f-number is an f-number of said illumination optical system in a direction matching the direction of said liquid crystal display device for first contrast properties,
   wherein said second f-number is an f-number of said illumination optical system in a direction matching the direction of said liquid crystal display device for second contrast properties with contrast properties higher than said first contrast properties,
   wherein said second aperture has a shape such that a first f-number of said projection optical system is greater than a second f-number of said projection optical system,
   wherein said first f-number is an f-number of said projection optical system in a direction matching the direction of said liquid crystal display device for first contrast properties, and
   wherein said second f-number is an f-number of said projection optical system in a direction matching the direction of said liquid crystal display device for second contrast properties with contrast properties higher than said first contrast properties.

5. A projector-type image display device according to claim 1,
   wherein said liquid crystal display device has a rectangular display portion, and
   wherein a width of said aperture of said diaphragm member in the diagonal direction as to a long side direction of said rectangular display portion is shorter than a width of said aperture in the direction matching the long side direction and short side direction of said rectangular display portion.

6. A projector-type image display device according to claim 1, wherein a size of said aperture of said diaphragm member is variable.

7. A projector-type image display device according to claim 1, wherein an optical axis of said projection optical system and a center of said liquid crystal display device are offset.

8. A projector-type image display device comprising:
   a plurality of liquid crystal display devices which each form images;
   an illumination optical system for dividing light from a light source into a plurality of different color lights, and illuminating each of said liquid crystal display devices with a matching color light;
   a color synthesizing optical system for synthesizing the images from each of the color lights from said plurality of liquid crystal display devices, said color synthesizing optical system comprising:
  an odd-number reflection optical path wherein an image of a color light from one liquid crystal display device of said plurality of liquid crystal display devices reflects an odd number of times on an optical path leading from said one liquid crystal display device to a projection optical system; and
  an even-number reflection optical path wherein an image of a color light from another liquid crystal display device of said plurality of liquid crystal display devices is non-reflective or reflects an even number of times on an optical path leading from said another liquid crystal display device to a projection optical system; and
the projection optical system for projecting an image synthesized by said color synthesizing optical system,
wherein at least one optical system of said illumination optical system and said projection optical system has different f-numbers at a plurality of directions from said at least one optical system, according to contrast properties of each direction of said liquid crystal display device and said reflection optical paths of said color synthesizing optical system.

9. A projector-type image display device according to claim 8,
wherein said at least one optical system is said illumination optical system,
wherein a first f-number of said illumination optical system is greater than a second f-number of said illumination optical system,
wherein said first f-number is an f-number of said illumination optical system in a direction matching the direction of said liquid crystal display device for first contrast properties, and
wherein said second f-number is an f-number of said illumination optical system in a direction matching the direction of said liquid crystal display device for second contrast properties with contrast properties higher than said first contrast properties.

10. A projector-type image display device according to claim 8,
wherein said one optical system is said projection optical system,
wherein a first f-number of said projection optical system is greater than a second f-number of said projection optical system,
wherein said first f-number is an f-number of said projection optical system in a direction matching the direction of said liquid crystal display device for first contrast properties, and
wherein said second f-number is an f-number of said projection optical system in a direction matching the direction of said liquid crystal display device for second contrast properties with contrast properties higher than said first contrast properties.

11. A projector-type image display device according to claim 8,
wherein a first f-number of said illumination optical system is greater than a second f-number of said illumination optical system,
wherein said first f-number is an f-number of said illumination optical system in a direction matching the direction of said liquid crystal display device for first contrast properties,
wherein said second f-number is an f-number of said illumination optical system in a direction matching the direction of said liquid crystal display device for second contrast properties with contrast properties higher than said first contrast properties;
wherein a first f-number of said projection optical system is greater than a second f-number of said projection optical system;
wherein said first f-number is an f-number of said projection optical system in a direction matching the direction of said liquid crystal display device for first contrast properties, and
wherein said second f-number is an f-number of said projection optical system in a direction matching the direction of said liquid crystal display device for second contrast properties with contrast properties higher than said first contrast properties.

12. A projector-type image display device according to claim 8, wherein an optical axis of said projection optical system and a center of said liquid crystal display device are offset.

13. A projector-type image display device comprising:
a plurality of liquid crystal display devices which each form images;
an illumination optical system for dividing light from a light source into a plurality of different color lights, and illuminating each of said liquid crystal display devices with a matching color light;
a color synthesizing optical system for synthesizing the images from each of the color lights from said plurality of liquid crystal display devices, said color synthesizing optical system comprising
  an odd-number reflection optical path wherein an image of a color light from one liquid crystal display device of said plurality of liquid crystal display devices reflects an odd number of times on an optical path leading from said one liquid crystal display device to a projection optical system, and
  an even-number reflection optical path wherein an image of a color light from another liquid crystal display device of said plurality of liquid crystal display devices is non-reflective or reflects an even number of times on an optical path leading from said another liquid crystal display device to a projection optical system;
a projection optical system for projecting an image synthesized by said color synthesizing optical system; and
a diaphragm member disposed on at least one optical system of said illumination optical system and said projection optical system,
wherein an aperture is formed in said diaphragm member;
wherein said aperture has a shape such that the f-numbers at a plurality of directions from said at least one optical system are different f-numbers, according to contrast properties of each direction of said liquid crystal display device and said reflection optical path of said color synthesizing optical system.

14. A projector-type image display device according to claim 13,
wherein said diaphragm member is disposed at said illumination optical system,
wherein said aperture of said diaphragm member has a shape such that a first f-number of said illumination optical system is greater than a second f-number of said illumination optical system, wherein said first f-number is an f-number of said illumination optical system in a direction matching the direction of said liquid crystal display device for first contrast properties, and wherein said second f-number is an f-number of said illumination optical system in a direction matching the direction of said liquid crystal display device for second contrast properties with contrast properties higher than said first contrast properties.

15. A projector-type image display device according to claim 13, wherein said diaphragm member is disposed at said projection optical system, wherein said aperture of said diaphragm member has a shape such that a first f-number of said projection optical system is greater than a second f-number of said projection optical system, wherein said first f-number is an f-number of said projection optical system in a direction matching the direction of said liquid crystal display device for first contrast properties, and wherein said second f-number is an f-number of said projection optical system in a direction matching the direction of said liquid crystal display device for second contrast properties with contrast properties higher than said first contrast properties.

16. A projector-type image display device according to claim 13, said diaphragm member comprising a first diaphragm member disposed at said illumination optical system, and a second diaphragm member disposed at said projection optical system, wherein a first aperture is formed in said first diaphragm member, a second aperture is formed in said second diaphragm member and said first aperture has a shape such that a first f-number of said illumination optical system is greater than a second f-number of said illumination optical system, wherein said first f-number is an f-number of said illumination optical system in a direction matching the direction of said liquid crystal display device for first contrast properties, and wherein said second f-number is an f-number of said illumination optical system in a direction matching the direction of said liquid crystal display device for second contrast properties with contrast properties higher than said first contrast properties, and wherein said second aperture has a shape such that a first f-number of said projection optical system is greater than a second f-number of said projection optical system, wherein said first f-number is an f-number of said projection optical system in a direction matching the direction of said liquid crystal display device for first contrast properties, and wherein said second f-number is an f-number of said projection optical system in a direction matching the direction of said liquid crystal display device for second contrast properties with contrast properties higher than said first contrast properties.

17. A projector-type image display device according to claim 13, wherein said liquid crystal display device has a rectangular display portion, and wherein a width of said aperture of said diaphragm member in the diagonal direction as to a long side direction of said rectangular display portion is shorter than a width of said aperture in the direction matching the long side direction and short side direction of said rectangular display portion.

18. A projector-type image display device according to claim 13, wherein a size of said aperture of said diaphragm member is variable.

19. A projector-type image display device according to claim 13, wherein the optical axis of said projection optical system and the center of said liquid crystal display device are offset.

20. A projector-type image display device comprising:

a liquid crystal display device for forming an image;

an illumination optical system for guiding light from a light source to said liquid crystal display device;

a projection optical system for projecting an image formed by said liquid crystal display device; and a diaphragm member disposed on at least one of said illumination optical system and said projection optical system, wherein an aperture is formed in said diaphragm member, and wherein the width of said aperture differs for each direction said aperture faces.

21. A projector-type image display device according to claim 20, wherein said liquid crystal display device has a rectangular display portion, and wherein a width of said aperture of said diaphragm member in the diagonal direction as to a long side direction of said rectangular display portion is shorter than a width of said aperture in the direction matching the long side direction and short side direction of said rectangular display portion.

22. A projector-type image display device according to claim 20, wherein a size of said aperture of said diaphragm member is variable.

23. A projector-type image display device according to claim 20, wherein an optical axis of said projection optical system and a center of said liquid crystal display device are offset.

24. A projector-type image display device comprising:

a plurality of liquid crystal display devices which each form images;

an illumination optical system for dividing light from a light source into a plurality of different color lights, and illuminating each of said liquid crystal display devices with a matching color light;

a color synthesizing optical system for synthesizing the images from each of the color lights from said plurality of liquid crystal display devices, said color synthesizing optical system comprising an odd-number reflection optical path wherein an image of a color light from one liquid crystal display device of said plurality of liquid crystal display devices reflects an odd number of times on an optical path leading from said one liquid crystal display device to a projection optical system, and an even-number reflection optical path wherein an image of a color light from another liquid crystal display device of said plurality of liquid crystal display devices is non-reflective or reflects an even number of times on an optical path leading from said another liquid crystal display device to a projection optical system;

a projection optical system for projecting an image synthesized by said color synthesizing optical system; and a diaphragm member disposed on at least one optical system of said illumination optical system and said projection optical system, wherein an aperture is formed in said diaphragm member and the width of said aperture differs for each direction said aperture faces.

25. A projector-type image display device according to claim 24, wherein said liquid crystal display device has a rectangular display portion, and wherein a width of said aperture of said diaphragm member in the diagonal direction as to a long side direction of said rectangular display portion is shorter than a width of said aperture in the direction matching the long side direction and short side direction of said rectangular display portion.

26. A projector-type image display device according to claim 24, wherein a size of said aperture of said diaphragm member is variable.

27. A projector-type image display device according to claim 24, wherein an optical axis of said projection optical system and a center of said liquid crystal display device are offset.

* * * * *

UNITED STATES PATENT AND TRADEMARK OFFICE
CERTIFICATE OF CORRECTION

PATENT NO. : 6,755,538 B2
DATED : June 29, 2004
INVENTOR(S) : Saburo Sugawara

It is certified that error appears in the above-identified patent and that said Letters Patent is hereby corrected as shown below:

Column 1,
Line 36, "a the" should read -- a --.
Line 62, "form" should read -- from --.

Signed and Sealed this

First Day of February, 2005

JON W. DUDAS
*Director of the United States Patent and Trademark Office*